US009444149B2

(12) United States Patent
Cha et al.

(10) Patent No.: US 9,444,149 B2
(45) Date of Patent: Sep. 13, 2016

(54) SATELLITE VSAT ANTENNA FOR TRANSMITTING/RECEIVING MULTIPLE POLARIZED WAVES

(75) Inventors: Seung-Hyun Cha, Hwaseong-si (KR); Ho-Seon Lee, Cheonan-si (KR); Jong-Hwan Cha, Hwaseong-si (KR)

(73) Assignee: INTELLIAN TECHNOLOGIES INC. (KR)

( * ) Notice: Subject to any disclaimer, the term of this patent is extended or adjusted under 35 U.S.C. 154(b) by 555 days.

(21) Appl. No.: 14/003,548

(22) PCT Filed: Mar. 5, 2012

(86) PCT No.: PCT/KR2012/001607
§ 371 (c)(1), (2), (4) Date: Sep. 6, 2013

(87) PCT Pub. No.: WO2012/121525
PCT Pub. Date: Sep. 13, 2012

(65) Prior Publication Data

US 2013/0342390 A1 Dec. 26, 2013

(30) Foreign Application Priority Data

Mar. 9, 2011 (KR) ........................ 10-2011-0020836

(51) Int. Cl.

| | |
|---|---|
| ***H04B 7/185*** | (2006.01) |
| ***H01Q 21/24*** | (2006.01) |
| ***H01P 1/161*** | (2006.01) |
| ***H01P 1/165*** | (2006.01) |
| ***H01Q 19/12*** | (2006.01) |
| ***H01Q 19/195*** | (2006.01) |

(52) U.S. Cl.
CPC .............. *H01Q 21/24* (2013.01); *H01P 1/161* (2013.01); *H01P 1/165* (2013.01); *H01Q 19/12* (2013.01); *H01Q 19/195* (2013.01)

(58) Field of Classification Search
CPC .... H01Q 21/24; H01Q 19/12; H01Q 19/195; H01P 1/161; H01P 1/165
USPC ......................................................... 342/352
See application file for complete search history.

(56) References Cited

PUBLICATIONS

English Translation of Written Opinion of the International Search Authority for PCT/KR2012/001607, Oct. 10, 2012.*

* cited by examiner

*Primary Examiner* — Frank J McGue
(74) *Attorney, Agent, or Firm* — Cantor Colburn LLP

(57) ABSTRACT

The present invention relates to a rotation apparatus of the polarizer for a multiple-polarized satellite signals and a satellite signal receiving apparatus included with the apparatus, includes a feedhorn for receiving satellite; a low noise block down converter for processing signals received by the feedhorn; and a skew compensation apparatus, included in the low noise block down converter or feedhorn, for rotating the low noise block down converter or feedhorn to compensate skew angles in the case that the satellite signals received in the feedhorn are the linearly polarized waves, the low noise block down converter includes the rotation apparatus of the polarizer for receiving linearly polarized signals and circularly polarized signals of the satellite signals, thereby to receive and process both of linearly polarized wave and circularly polarized wave by a simple structure.

15 Claims, 10 Drawing Sheets

SATELLITE VSAT ANTENNA FOR TRANSMITTING/RECEIVING MULTIPLE POLARIZED WAVES

BACKGROUND OF THE INVENTION

1. Technical Field

The present invention relates to a satellite VSAT antenna or a satellite communication antenna for transmitting/receiving (transceiving) multiple polarized waves, and more particularly, to a bidirectional satellite communication antenna for transmitting/receiving multiple polarized waves capable of transmitting/receiving both of linearly polarized waves and circularly polarized waves of satellite signals and of compensating skew caused due to the linearly polarized waves.

2. Description of the Related Art

A reflector antenna is generally used for satellite communication, high-capacity wireless communication, etc. The reflector antenna concentrates signals received using the principal of a reflecting telescope on at least one focus. Generally, focus positions of the reflector antenna may be disposed with a horn antenna or a feed horn. Wherein, the antenna representing the reflector antenna is a parabolic antenna.

The received signals are reflected at the reflector antenna and therefore are transferred into the feedhorn, and the feedhorn transfers signals inputted to the feedhorn through a waveguide into a low noise block down converter (LNB). Further, the low noise block down converter converts the signals received from the feedhorn into the signals at an intermediate frequency band to finally transfer the converted signals into external image reproducing media such as a TV set-top box. On the contrary, transmission signals having intermediate frequencies are changed into high frequency signals through the block up converter (BUC) to radiate the changed signals into the air in the direction of a satellite through the feedhorn and reflector antenna.

The satellite communication antenna or the satellite VSAT antenna performing both of transmission and receipt should minimize interference between transmitting signals and receiving signals. One method for minimizing the interference between the transmitting signals and the receiving signals is that the frequency band of the transmitting signals is differently set with it of the receiving signals. For example, the frequency band of the receiving signals at a band Ku is set to 10.7~12.75 GHz and the frequency band of the transmitting signals is set to 13.75~14.5 GHz, thereby to prevent the interference between the receiving signals and the transmitting signals. Further, in case of a band C, the frequency band of the receiving signals is set to 3.4~4.2 GHz and the frequency band of the transmitting signals is set to 5.85~6.725 GHz. The other one method, which improves an isolation degree between the transmitting signals and the receiving signals, use differently the polarized wave for the transmitting signals and the receiving signals. For example, the receiving signals use the horizontally polarized wave and the transmitting signals use the vertically polarized wave or, on the contrary, they may be used. On mentioning in more detail, they may use random 2 linearly polarized waves orthogonal to each other according to skew angles of the linearly polarized wave rather than the vertically/horizontally polarized waves. Further, the receiving signals use left hand circularly polarized wave and the transmitting signals use right hand circularly polarized wave or, on the contrary, they may be used.

On the other hand, the vertically/horizontally linearly polarized waves or left/right hand circularly polarized waves are set to the polarized waves used for the transmission/receipt of the satellite communication antenna or satellite VSAT antenna according to regions. Therefore, the polarized waves of maritime/athletic satellite communication (or VSAT) antennas using them should be also set to the linearly or circularly polarized waves. Since polarized wave characteristics are set according the regions in case of the satellite antenna on the ground, the feeder is disposed according to the polarized wave including the circularly polarized wave or the linearly polarized wave. When the low noise block down converter and block up converter suitable for the feeder are used, it is unnecessary to replace the feeder hereinafter. However, in case of a maritime satellite antenna, since the polarized wave characteristics of the satellite are changed from the circularly polarized wave to the linearly polarized wave or from the linearly polarized wave to the circularly polarized wave according the movement of a ship between countries and continents, the linearly polarized wave and the circularly polarized wave should be selectively received. However, in order to selectively transmit/receive the linearly polarized wave and the circularly polarized wave at the moment, it is necessary to replace the feeder suitable for the polarized wave and to perform inconvenient operations such as the reassembling of the low noise block down converter and block up converter.

In particular, in case of a maritime satellite tracking antenna, it was impossible to replace the feeder for the circularly polarized wave and the feeder for the linearly polarized wave with each other without special knowledges about the assemblies and disassemblies of a maritime antenna due to the complexity of the apparatus such as a radome and the antenna environment being pumped by waves.

Further, the transmitting/receiving polarized waves of the satellite communication or VSAT antenna may implement all of the horizontally/vertically linearly polarized waves and the left hand/right hand circularly polarized waves, and the functions capable of automatically compensating the skew angles are surely necessary in case of actuating by the horizontally/vertically linearly polarized waves.

That is to say, on transmitting and receiving with the satellite by randomly linearly polarized wave, the skew angles of compensating errors of the satellite signal polarized and therefore automatically aligning the feeder of the antenna should be controlled in a comparative simple structure.

In case of the linearly polarized wave, distortions of the linearly polarized wave are caused due to Faraday rotation generated in an ionization layer. The difference between the angles of the linearly polarized wave bent by the distortions and original linearly polarized wave is called the skew angles, and the satellite antenna should surely compensate the skew angles in order to minimize the decrease for the transmitting signals and receiving signals.

The skew angles are compensated by rotating the satellite antenna itself by the skew angles in case of the existing case, and the satellite antenna itself is rotated by this scheme. Therefore, the size of the satellite antenna is increased, much manufacturing cost is required, and power loss become much higher.

SUMMARY OF THE INVENTION

One embodiment of the present invention provides a satellite VSAT antenna or a satellite communication antenna for transmitting/receiving multiple polarized waves capable of processing multiple-polarized satellite signals having linearly polarized wave and circularly polarized wave characteristics using one low noise block down converter, block up converter and orthogonal mode transducer.

Another embodiment of the present invention provides a satellite VSAT antenna or a satellite communication antenna for transmitting/receiving multiple polarized waves capable of rotating a polarizer or part of the feeder to process the multiple-polarized satellite signals having the linearly polarized wave and circularly polarized wave characteristics by one antenna feeder.

Further another embodiment of the present invention provides a satellite VSAT antenna or a satellite communication antenna for transmitting/receiving multiple polarized waves capable of rotating the whole feeder to automatically compensate skew generated in the case that signals transmitted from a satellite are the linearly polarized wave.

According to an aspect of the invention, there is provided a satellite VSAT antenna or a satellite communication antenna for transmitting/receiving multiple polarized waves, including: a feedhorn for receiving signals from a satellite or transmitting the signals to the satellite; a polarizer, connected to the feedhorn, for transmitting/receiving linearly polarized wave and circularly polarized wave of the satellite signals; an orthogonal mode transducer, connected to the polarizer, for enabling multi band feed of the satellite signals; a block up converter, connected to one end of the orthogonal mode transducer to face with the polarizer, for transmitting the satellite signals through the polarizer; a low noise block down converter, connected to the orthogonal mode transducer to cross with the polarizer, for receiving the satellite signals passing through the polarizer; a skew compensation apparatus, included in the orthogonal mode transducer, for simultaneously rotating the polarizer and the orthogonal mode transducer to compensate skew angles in the case that the satellite signals passing through the polarizer are the linearly polarized waves; and a polarization conversion apparatus, included in the polarizer, for rotating the polarizer in the case that the satellite signals passing through the polarizer are the circularly polarized waves.

With the configurations as above, one low noise block down converter and block up converter may transmit/receive the linearly polarized wave and circularly polarized wave, and may easily compensate the skew angle generated on receiving the linearly polarized wave.

The polarization conversion apparatus includes a phase conversion section, in the polarizer having a hollow shape so that the satellite signals are passed, for converting the circularly polarized wave of the satellite signals into the linearly polarized wave, and a rotation section of the polarizer, at both ends of the polarizer, for rotating the polarizer.

The rotation section of the polarizer includes a driving section provided to a longitudinal one side of the polarizer, a driven section, in an outer surface of the polarizer, for receiving driving force of the driving section and rotating the polarizer, and a bearing section for supporting both ends of the polarizer.

The rotation section of the polarizer includes a rotation angle sensing section for sensing rotation angles of the polarizer and for controlling the actuation of the driving section.

A port of the orthogonal mode transducer includes a sharing port connected to the polarizer, a transmitting port facing with the sharing port, and a receiving port crossing with the transmitting port, and the transmitting port and receiving port are formed in a rectangular type, respectively.

The polarization conversion apparatus may change the angles of the phase conversion section for the receiving port or transmitting port of the orthogonal mode transducer.

The polarization conversion apparatus rotates the polarizer so that the phase conversion section is at 45 degrees to the receiving port or transmitting port of the orthogonal mode transducer in the case that the satellite signals passing through the polarizer are the circularly polarized waves.

The polarization conversion apparatus rotates the polarizer so that the phase conversion section is in parallel with or orthogonal to the receiving port or transmitting port of the orthogonal mode transducer in the case that the satellite signals passing through the polarizer are the linearly polarized waves.

The skew compensation apparatus simultaneously rotates the polarizer, the low noise block down converter and the orthogonal mode transducer at a predetermined angle to compensate skew in the case that the satellite signals passing through the polarizer are the linearly polarized waves.

The skew compensation apparatus may include a skew compensation section, at one end of the polarizer and orthogonal mode transducer, for rotating the polarizer and orthogonal mode transducer at once.

The skew compensation section includes a skew driving section provided to the longitudinal one side of the orthogonal mode transducer, a skew driven section, in the outer surface of the orthogonal mode transducer, for receiving the driving force of the skew driving section and for simultaneously rotating the polarizer and orthogonal mode transducer, and a skew bearing section for supporting one end of the polarizer and one end of the orthogonal mode transducer.

The skew compensation section may include a skew angle sensing section for sensing rotation angles of the orthogonal mode transducer and for controlling the actuation of the skew driving section.

In the case that the satellite signals passing through the polarizer are the linearly polarized waves, the polarization conversion apparatus rotates the polarizer so that the phase conversion section is orthogonal to or in parallel with the receiving port or transmitting port of the orthogonal mode transducer, and the skew compensation apparatus rotates the polarizer and orthogonal mode transducer at once to compensate the skew in the state being rotated with the phase conversion section by the polarization conversion apparatus.

The transmitting port is coupled with the block up converter and the receiving port is coupled with the low noise block down converter, and the transverse direction of the transmitting port is crossed with the longitudinal direction of the receiving port.

The transverse direction of the transmitting port and the longitudinal direction of the receiving port are coincident with a vertically polarized wave direction and horizontally polarized wave direction, respectively or are coincident with the horizontally polarized wave direction and the vertically polarized wave direction, respectively.

DESCRIPTION OF THE PREFERRED EMBODIMENTS

Figure 1:
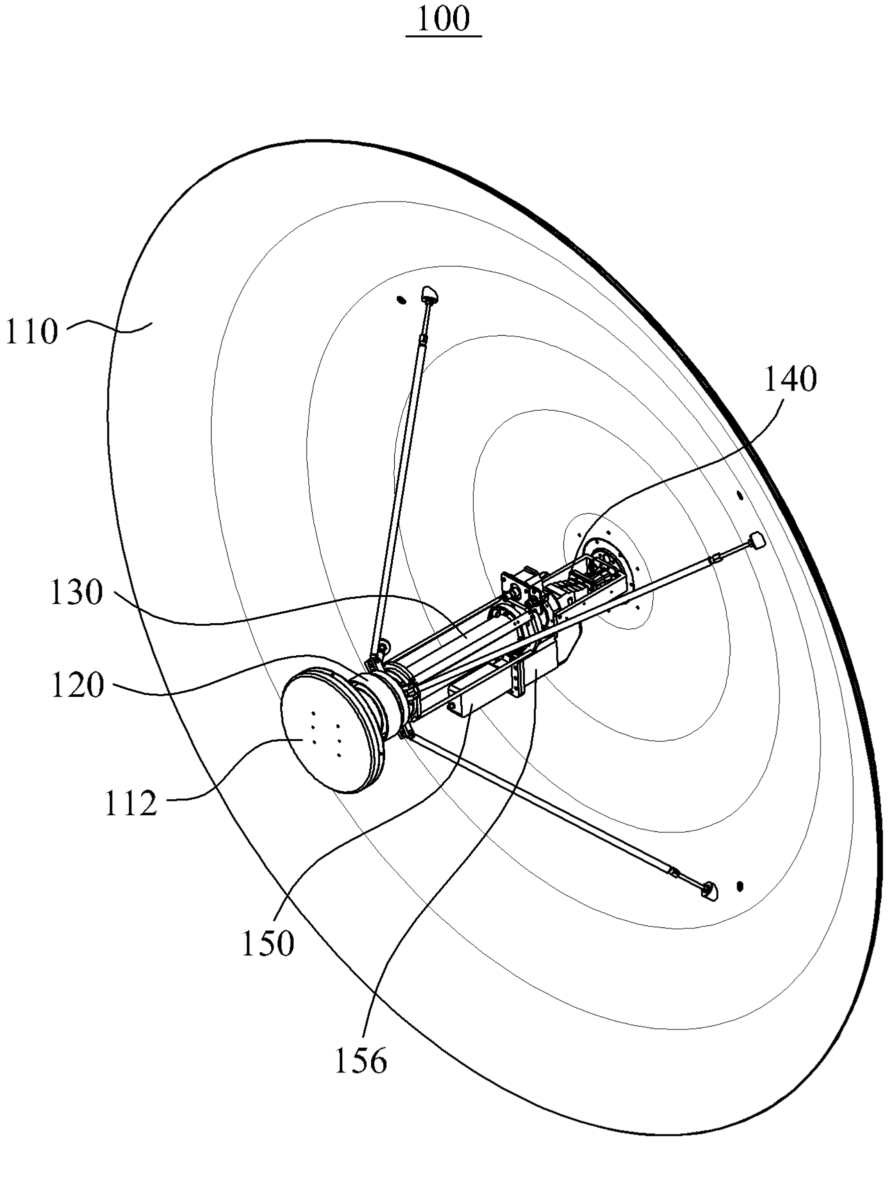
FIG. 1 is a perspective view showing a satellite VSAT antenna according to one embodiment of the present invention.

Hereinafter, embodiments of the present invention will be described in detail with reference to the accompanying drawings. Therefore, the present invention is not limited to the embodiments. Like reference numerals refer to like elements.

Figure 2:
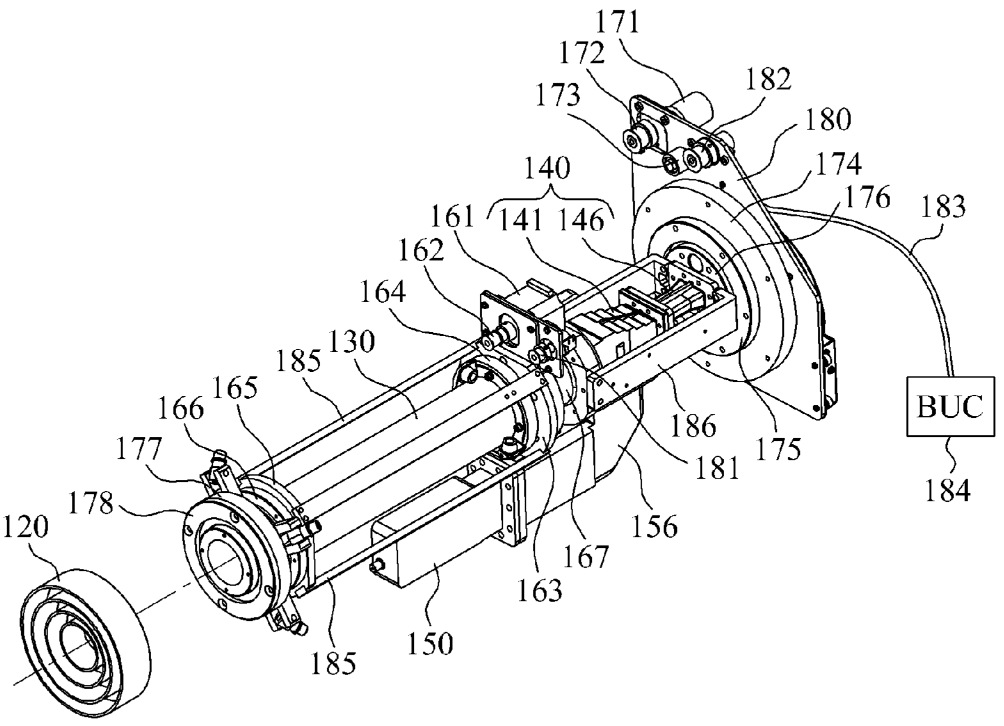
FIG. 2 is a perspective view showing the center of the satellite VSAT antenna shown in FIG. 1.
Figure 3:
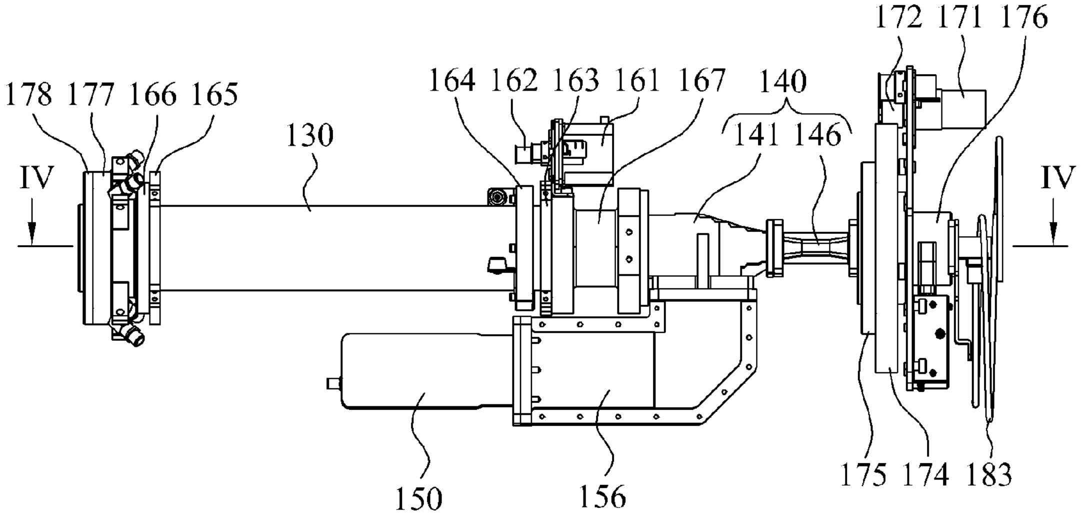
FIG. 3 is a side view showing the center shown in FIG. 2.
Figure 4:
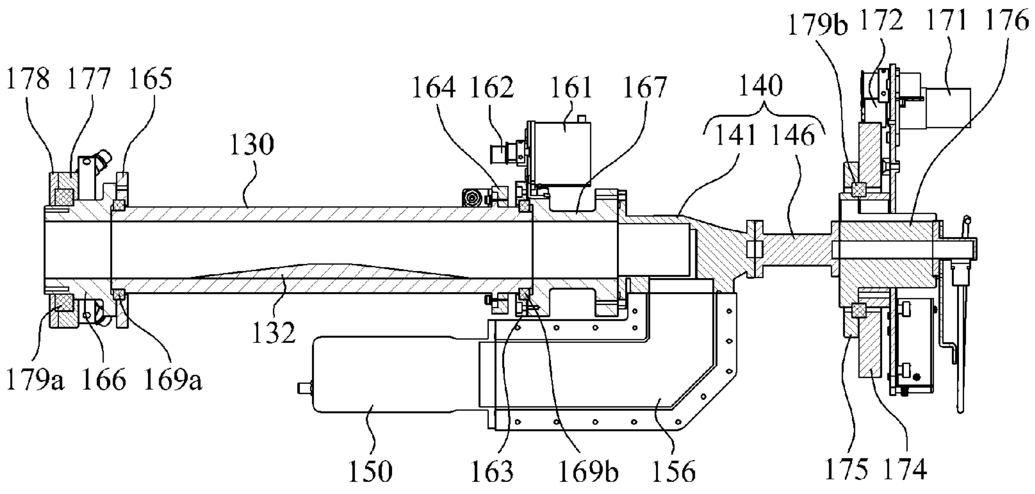
FIG. 4 is a cross-sectional view taken by line IV-IV of FIG. 3.
Figure 7:
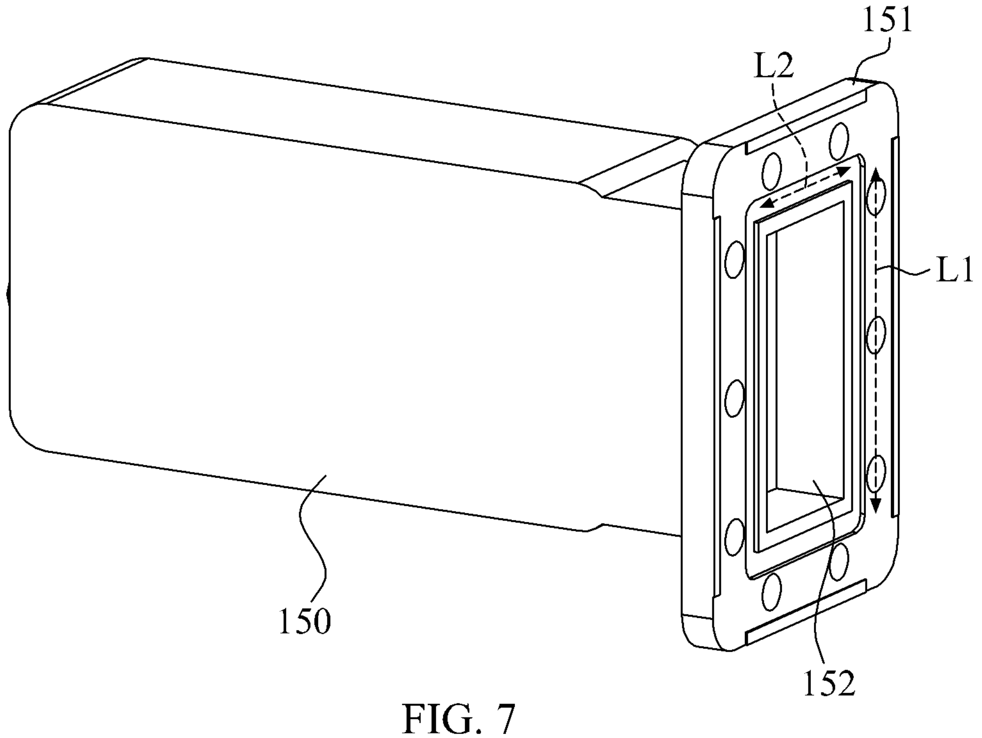
FIG. 7 is a perspective view showing a low noise block down converter of the center shown in FIG. 2.
Figure 8A:
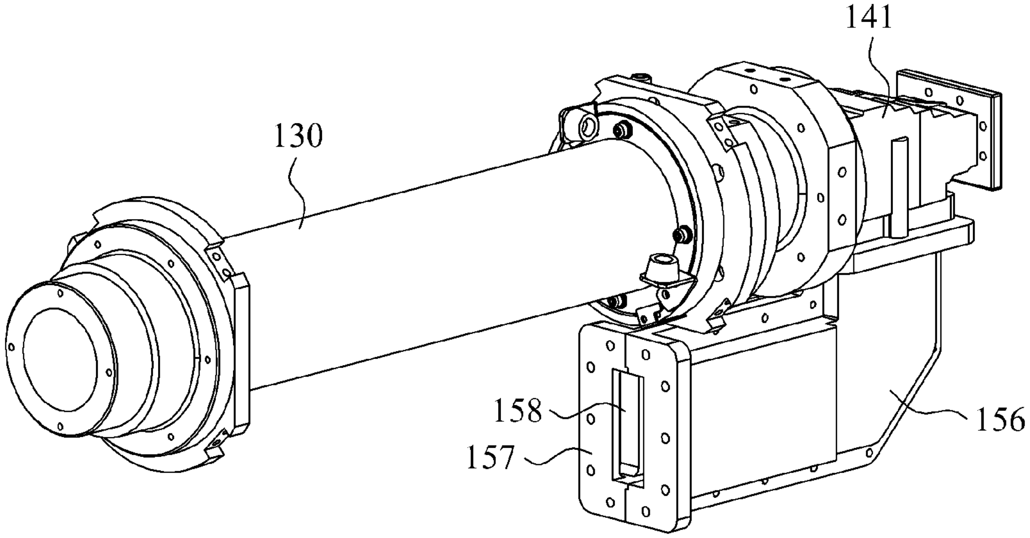
FIGS. 8A and 8B are perspective views showing connecting states among the polarizer, the orthogonal mode transducer, and the low noise block down converter of the center shown in FIG. 2.
Figure 8B:
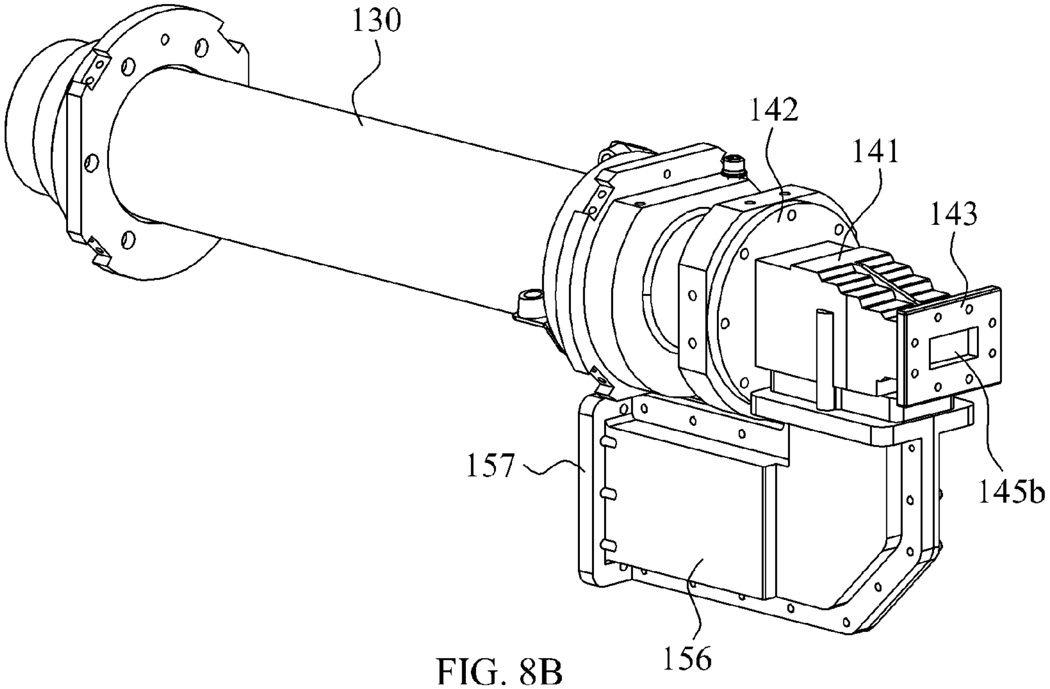
Figures 9A, 9B, 9C, 9D, 9E, 9F, 9G, 9H:
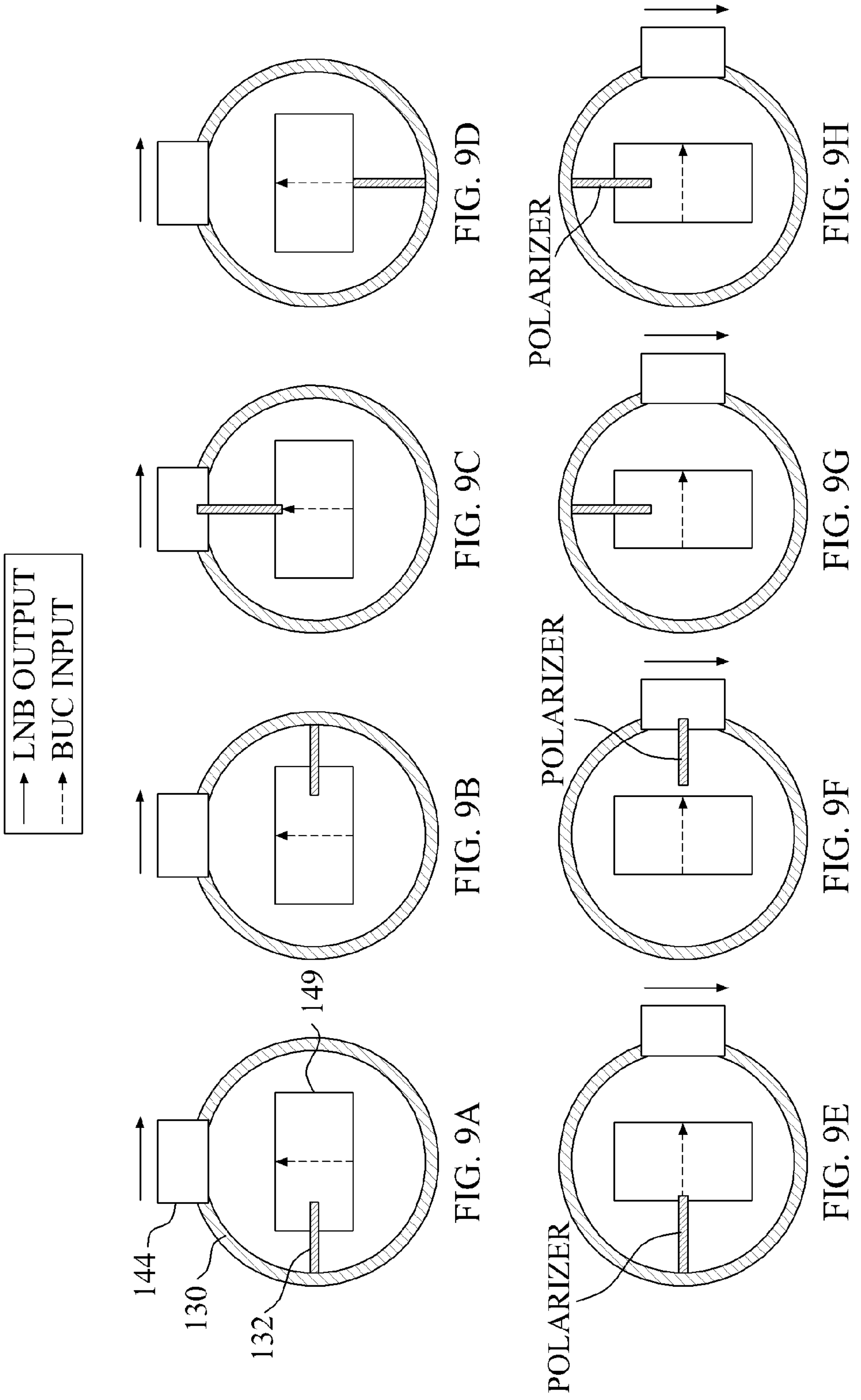
FIGS. 9A to 9H are views showing the inside of the polarizer when the satellite VSAT antenna shown in FIG. 1 transmits/receives linearly polarized wave.

FIG. 1 is a perspective view showing a satellite VSAT antenna or a satellite communication antenna according to one embodiment of the present invention, FIG. 2 is a perspective view showing the center of the satellite VSAT antenna shown in FIG. 1, FIG. 3 is a side view showing the center shown in FIG. 2, FIG. 4 is a cross-sectional view taken by line IV-IV of FIG. 3, FIGS. 5A to 5F are cross-sectional views showing the inside of a polarizer of the center shown in FIG. 2, FIGS. 6A to 6C are perspective views showing an orthogonal mode transducer of the center shown in FIG. 2, FIG. 7 is a perspective view showing a low noise block down converter of the center shown in FIG. 2, FIGS. 8A and 8B are perspective views showing the connecting states among the polarizer, the orthogonal mode transducer, and the low noise block down converter of the center shown in FIG. 2, FIGS. 9A to 9H are views showing the inside of the polarizer when the satellite VSAT antenna shown in FIG. 1 transmits/receives linearly polarized wave, and FIGS. 10A to 10H are views showing the inside of the polarizer when the satellite VSAT antenna shown in FIG. 1 transmits/receives circularly polarized wave.

Referring to FIG. 1 and FIG. 2, a satellite VAST antenna (or a satellite communication antenna) 100, which is called a VSAT (Very Small Aperture Terminal) antenna, for transmitting/receiving multiple polarized waves in one embodiment of the present invention may receive satellite signals and transmit the signals to the satellite such that bidirectional communication including Internet communication, etc. may be performed.

The satellite VAST antenna 100 for transmitting/receiving multiple polarized waves in one embodiment of the present invention includes a feedhorn 120 for receiving the signals from the satellite or transmitting the signals to the satellite, a polarizer 130, connected to the feedhorn 120, for transmitting and receiving linearly polarized wave and circularly polarized wave of the received satellite signals, an orthogonal mode transducer 140, connected to the polarizer 130, for feeding multi-bands of the received satellite signals, a block up converter 184, connected to one end of the orthogonal mode transducer 140 to face with the polarizer 130, for transmitting the received satellite signals through the polarizer 130, a low noise block down converter 150, connected to the orthogonal mode transducer 140 to cross with the polarizer 130, for receiving the received satellite signals passing through the polarizer 130, a skew compensation apparatus, included in the orthogonal mode transducer 140, for simultaneously circulating the polarizer 130 and orthogonal mode transducer 140 to compensate skew angles in the case that the received satellite signals passing through the polarizer 130 are the linearly polarized waves, and a polarization conversion apparatus, included in the polarizer 130, for circulating the polarizer 130 in the case that the received satellite signals passing through the polarizer 130 are the circularly polarized waves.

On the other hand, the satellite VAST antenna 100 for transmitting/receiving multiple-polarized waves in one embodiment of the present invention may be disposed in moving objects moving on the sea such as ships, etc. and may transmit/receive the satellite signals at a band C of frequency bands of various satellite signals. However, the satellite VAST antenna 100 in one embodiment of the present invention is surely not limited to the case for transmitting/receiving the signals at the band C. That is, it is natural that the satellite VAST antenna in one embodiment of the present invention may be applied even in the case that it transmits/receives the signals at a band Ku, a band Ka, a band x, a band L, a band S, etc.

Wherein, the polarizer 130, the low noise block down converter 150, the orthogonal mode transducer 140 and the block up converter 184 may form a kind of feeder. That is, the satellite VAST antenna 100 in one embodiment of the present invention may transmit/receive the satellite signals using one feeder formed by the polarizer 130, the low noise block down converter 150, the orthogonal mode transducer 140 and the block up converter 184. The satellite VAST antenna 100 for transmitting/receiving the multiple-polarized waves in one embodiment of the present invention may include a main reflection board 110, a satellite signal communication section (not shown) penetrating the middle part of the main reflection board 110, a sub-reflection board 112 disposed in one end of the satellite signal communication section and facing with the main reflection board 110, and at least 3 supporting bars (not shown) supporting and fixing the satellite signal communication section to the main reflection board 110.

Wherein, the satellite signal communication section, which is the center of the satellite VAST antenna 100 in one embodiment of the present invention, may receive the signals at a specific frequency band or may transmit the signals to the satellite. The satellite signal communication section may include the feedhorn 120, the polarizer 130, the orthogonal mode transducer 140, the low noise block down converter 150, and the waveguide 156. Wherein, the low noise block down converter 150, which receives the satellite signals at a specific band, is called a LNB. On the other hand, the block up converter 184 shown in FIG. 2, which transmits the signals to the satellite, is disposed in an outer side of the main reflection board 110 and is called a BUC. The low noise block down converter and block up converter become main apparatuses on transmitting and receiving the satellite signals.

As shown in FIG. 2, the low noise block down converter 150 is connected to the block up converter 184 by the orthogonal mode transducer 140. The orthogonal mode transducer (OMT, 140), which separates two electronic wave contents orthogonally polarized to each other, is a main component on implementing the satellite VSAT antenna. The orthogonal mode transducer 140 is used as an antenna feed, having multi-bands, for receiving some types of satellite signals by one main reflection board. On the other hand, the orthogonal mode transducer 140 in the present invention is necessary for together disposing the low noise block down converter 150 and block up converter 184.

The orthogonal mode transducer 140 in one embodiment of the present invention may perform the blocking or passing function for frequencies at the specific band on transmitting/receiving multiple polarized waves, but the orthogonal mode transducer 140 itself does not convert the linearly polarized wave of vertically or horizontally polarized wave into the circularly polarized wave or does not convert the circularly polarized wave into the linearly polarized wave of vertically or horizontally polarized wave. The present invention uses a separate means for converting the linearly polarized wave into the circularly polarized wave or the circularly polarized wave into the linearly polarized wave wherein the contents thereof are described in detail hereinafter.

Referring FIG. 2 to FIG. 4, a satellite signal communication section of the satellite VAST antenna 100 for transmitting/receiving the multiple-polarized waves in one embodiment of the present invention may include the polarization conversion apparatus for selectively transmitting/receiving the linearly polarized wave or circularly polarized wave of the satellite signals, and the skew compensation apparatus for compensating the skew angles in the case that the satellite signals are the linearly polarized waves. At this time, the polarization conversion apparatus and skew compensation apparatus are rotated separately from each other on a concentric axis.

With the configurations as above, one low noise block down converter 150 and block up converter 184 may transmit/receive the linearly polarized wave and circularly polarized wave, and may easily compensate the skew angles generated on receiving the linearly polarized wave.

Wherein the polarization conversion apparatus may convert the linearly polarized wave into the circularly polarized wave or, on the contrary, the circularly polarized wave into the linear polarization, and therefore, may transmit/receive the multiple-polarized waves that may receive both of the linearly polarized wave and the circularly polarized wave at the specific band frequency (for example, the band C). That is, the polarization conversion apparatus converts the circularly polarized wave of the satellite signals into the linearly polarized wave on wanting to use the circularly polarized wave, and may maintain the linearly polarized wave as it is without polarization conversion on wanting to use the linearly polarized wave.

Hereinafter, the configurations for the polarization conversion apparatus and skew compensation apparatus will be described in more detail with reference to drawings.

Referring to FIG. 2 to FIG. 4, the polarization conversion apparatus may include a hollow-shaped polarizer 130 through which the satellite signals pass, a phase conversion section 132, formed in the inside of the polarizer 130, for converting the circularly polarized wave of the satellite signals into the linearly polarized wave on wanting to use the circularly polarized wave and maintaining the linearly polarized wave as it is, without the polarization conversion on wanting to use the linearly polarized wave, and a rotation section 161 to 166 of the polarizer, formed in both ends of the polarizer 130, for rotating the polarizer 130 or part of the feeder.

Wherein the polarizer 130, formed with a hollow tube having a circle or quadrangle as shown in FIGS. 5A to 5F, is a member through which the satellite signals received by the feedhorn 120 disposed in one end thereof pass. On the other hand, a phase conversion section 132, formed in the inside of the polarizer 130, gives a change of phase to the circularly polarized wave of the satellite signals passing through the polarizer, thereby to perform the function for converting the circularly polarized wave into the linearly polarized wave.

Figure 5A:
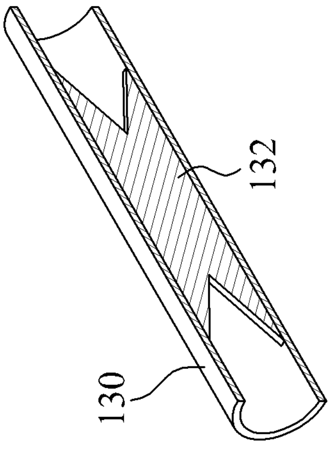
FIGS. 5A to 5F are cross-sectional views showing the inside of a polarizer of the center shown in FIG. 2.
Figure 5B:
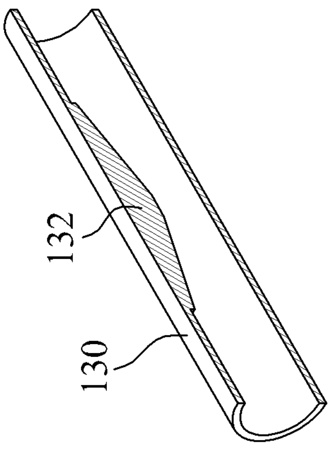
Figure 5C:
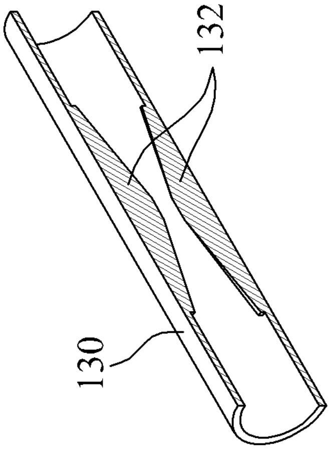

Referring to FIGS. 5A to 5F, a polarizer 130 and phase conversion section 132 may be formed in various types. First, the polarizer 130 may be formed in a hollow cylinder shape as shown in FIG. 5A to FIG. 5C. At this time, the phase conversion section 132 is formed across the inside of the polarizer 130 (refer to FIG. 5A), is formed in one side only of the inside of the polarizer 130 (refer to FIG. 5B), or is formed to face with each other in both sides inside the polarizer 130 (refer to FIG. 5C).

Figure 5D:
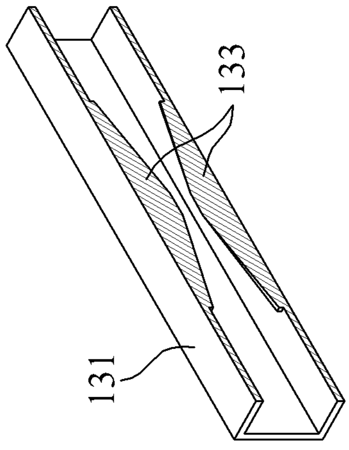
Figure 5E:
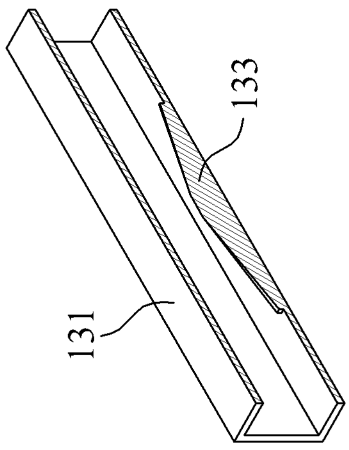
Figure 5F:
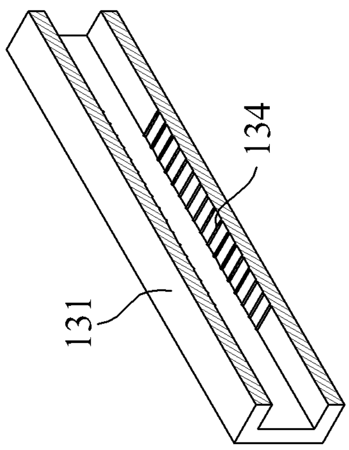
Figure 6B:
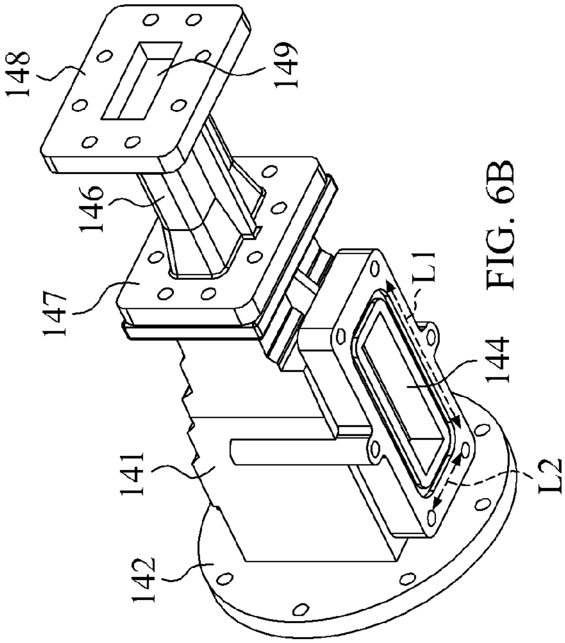
FIGS. 6A to 6C are perspective views showing an orthogonal mode transducer of the center shown in FIG. 2.
Figure 6A:
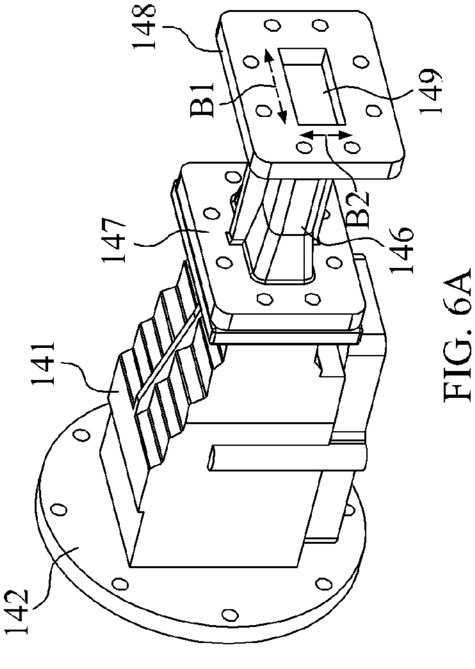
Figure 6C:
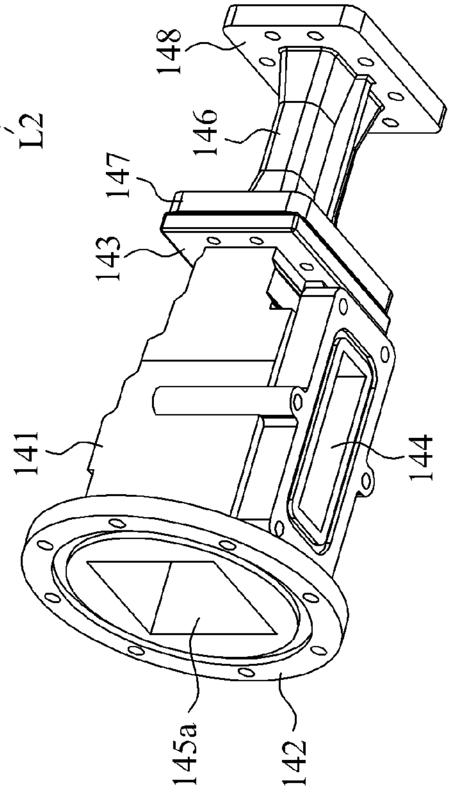

Further, the polarizer 131 may be formed in a hollow quadrangle shape as shown in FIG. 5D to FIG. 5F. At this time, the phase conversion section 133 is formed to face with each other in both sides inside the polarizer 131 (refer to FIG. 5D), the phase conversion section 133 is formed in one side only of the inside of the polarizer 131 (refer to FIG. 5E), or the phase conversion sections 134 is formed in many groove types inside the polarizer 131 (refer to FIG. 5F). Wherein the phase conversion sections 132, 133 formed inside the polarizers 130, 131 are formed with soft plastic material such as Teflon or dielectric, and are desirable to have a plate shape having the thickness of about 2 mm. The sectional shape of the polarizer and the shape or material of the phase conversion section may be variously designed by requested conditions and are not limited to the above contents.

On the other hand, the satellite signal communication section may include the polarizer 130 electrically connecting from the feedhorn 120 to the block up converter 184, the orthogonal mode transducer 140, the low noise block down converter 150, and the waveguide 156 as well as the polarization conversion apparatus and skew compensation apparatus. Wherein the polarization conversion apparatus rotates the polarizer 130 only, and the skew compensation apparatus simultaneously rotates the orthogonal mode transducer 140, the low noise block down converter 150, and the waveguide 156, including the polarizer 130, at once. That is, the polarization conversion apparatus rotates part of the feeder or the polarizer 130, and the skew compensation apparatus rotates the whole feeder or all of the polarizer 130, the orthogonal mode transducer 140 and the low noise block down converter 150 at once.

A first adapter 166 connecting the feedhorn 120 and the polarizer 130 is connected to one end of the polarizer 130 disposed toward the feedhorn 120. At this time, a bearing 169*a* of a first polarizer is disposed between the feedhorn 120 and the polarizer 130, a housing 165 of a first bearing is provided to an outer circumference surface of the bearing 169*a* of the first polarizer and may be fastened with a flange of the first adapter 166. Likewise, with the bearing 169*a* of the first polarizer, the polarizer 130 may perform relative rotary movement against the first adapter 166.

Further, the other end of the polarizer 130 is provided with a second adapter 167 connecting the polarizer 130 to the orthogonal mode transducer 140, and the bearing 169*a* of a second polarizer of enabling relative rotation of the polarizer 130 may be provided to the second adapter 167. In order to mount the bearing 169*b* of a second polarizer on an outer surface of the polarizer 130, the circumference of the polarizer 130 is disposed with a housing 163 of a second bearing that may be fastened with the flange of the second adapter 167. On the other hand, the first adapter 166 and second adapter 167 may be omitted.

Likewise, both ends of the polarizer 130 are provided with a bearing section, including the bearing 169*a* and 169*b* of the first and second polarizer, supporting both ends of the polarizer 130, and therefore, the polarizer 130 only or part only of the feeder may be rotated against the first adapter 166 and second adapter 167. In order to rotate the polarizer 130, a longitudinal one side of the polarizer 130 is provided with a driving section, and a driven pulley for receiving driving force of the driving section and rotating the polarizer 130 may be formed in the outer surface of the polarizer 130.

The driving section may be fixed to at least one spot of the first adapter 166 or the second adapter 167 connected to both ends of the polarizer 130. Referring to FIG. 2 to FIG. 4, the second adaptor 167 is fixed with the driving section. The driving section is a driving motor 161, fixed to the second adaptor 167, for rotating the polarizer 130, and one end of a rotation axis of the driving motor 161 may be formed with a driving pulley 162. The outer surface of the polarizer 130 may be formed with the driving section or the driven pulley 164 for receiving the driving force of the driving motor so that the driving pulley 162 has the same position as the driving section. The driving pulley 162 is connected to the driven pulley 164 by a belt (not shown), etc., and therefore the belt may transfer the driving force of the driving motor 161 to the polarizer 130. At this time, the driving pulley 162 and the driven pulley 164 are formed in a sprocket type, and they are connected by a chain for transferring the driving force of the driving motor 161. In addition, the driving pulley 162 and the driven pulley 164 are directly engaged to each other in a gear type to rotate the polarizer 130.

As described above, the polarization conversion apparatus includes a rotating section of the polarizer configured with the driving section 161 provided to the longitudinal one side of the polarizer 130, the driven section 164, in the outer surface of the polarizer 130, for receiving the driving force of the driving section 161 and rotating the polarizer 130, and the bearing sections 169*a* and 169*b* for supporting both ends of the polarizer 130. Therefore, the rotating section of the polarizer rotates the polarizer 130 or part of the feeder at a predetermined angle and also rotates the phase conversion section 132 inside the polarizer 130 at the same predetermined angle, on receiving the circular polarization, such that the phase of the circular polarization is converted into the linearly polarized wave and the polarization conversion apparatus may receive the converted linearly polarized wave. At this time, the control to rotate the phase conversion section 132 and the polarizer 130 at the predetermined angle is necessary to convert the circularly polarized wave into the linearly polarized wave wherein, to this end, the rotation section of the polarizer may include a rotation angle sensing section 181 for rotation angles for sensing the rotation angles of the polarizer 130 and controlling the driving motor 161 or the actuation of the driving section. The rotation angle sensing section 181, disposed in the same position as the driving motor 161, senses the rotation angles of the driving pulley 162, senses the rotation angles of the polarizer 130 or the phase conversion section 132, and may control the rotation angles.

On the other hand, the skew compensation apparatus may include the second adapter or the adapter 167 of the polarizer connected to one end of the polarizer 130, the orthogonal mode transducer 140 connected to the other end of the polarizer 130 and connected with the low noise block down converter 150, and a skew compensation section 171, 172, 174 and 175, formed in one end of the adaptor of the polarizer or the second adaptor 167 and the orthogonal mode transducer 140, for rotating the polarizer 130 and the orthogonal mode transducer 140 at once.

The other end of the second adapter 167 is connected with the orthogonal mode transducer 140, and the other end of the orthogonal mode transducer 140, that is, an opposite end thereof connected with the second adapter 167 may be connected with a third adaptor 176. One end of the third adapter 176 may be connected with a cable 183 connected with the block up converter 184. Wherein, the second adaptor 167, the orthogonal mode transducer 140, and the third adaptor 176 are fastened to be integrally rotated, and may not perform relative rotation against each other.

On the other hand, the outer circumference surface of the front end of the first adaptor 166 connected to one end of the polarizer 130 is provided with a first skew bearing 179*a*, and the outer circumference surface of the first skew bearing 179*a* may be disposed with a skew bearing housing 177 and the flange section 178 fastened thereto. Further, the outer circumference surface of the third adapter 176 is provided with the second skew bearing 179*b* and the outer circumference surface of the second skew bearing 179*b* are disposed with a skew driven pulley 174 and skew bearing cap 175, thereby to guide the second skew bearing 179*b*.

On rotating the first to third adapters 166, 167 and 176, the polarizer 130, the orthogonal mode transducer 140, and the low noise block down converter 150 connected to the orthogonal mode transducer 140 at once, the first and second skew bearings 179*a* and 179*b* disposed in the outer surface of the first adaptor 166 may support both ends of the whole them. The skew compensation apparatus rotates the polarizer 130, the block up converter 184, the orthogonal mode transducer 140 and the low noise block down converter 150 connected to the orthogonal mode transducer 140 simultaneously or the whole feeder at the predetermined angle, in the case that the satellite signals passing through the polarizer 130 are the linearly polarized waves, to compensate the skew.

In order to simultaneously rotate the whole feeder including the polarizer 130, the low noise block down converter 150, the block up converter 184 and the orthogonal mode transducer 140 at once, at least any one of the first to third adapters 166, 167 and 176 is fixed with a skew driving section. Referring to the drawings, the skew driving section 171 is fixed to the third adaptor 176. The skew driving section 171 is a skew motor 171, fixed to the third adaptor 176, for generating rotation driving force, and one end of the rotation axis of the skew motor 171 may be formed with the skew driving pulley 172. The outer surface of the third adaptor 176 may be formed with the driven section or the skew driven pulley 174 for receiving the driving force of the skew motor 171 so that the driven section has the same side position as the skew driving pulley 172. The skew driving pulley 172 is connected to the skew driven pulley 174 by the belt (not shown), etc., and therefore the belt may transfer the driving force of the skew motor 171 to the adapter adaptor 176. At this time, the skew driving pulley 172 and the skew driven pulley 174 are formed in a sprocket type, and they are connected by a chain for transferring the driving force of the skew motor 171. In addition, the skew driving pulley 172 and the skew driven pulley 174 are directly engaged to each other in a gear type, to rotate the third adaptor 176.

Wherein the third adaptor 176 may be omitted, the second skew bearing 179*b*, the skew driving section 171, etc may be disposed in the outer circumference surface of the orthogonal mode transducer 140 on omitting the third adaptor 176.

As described above, a skew compensation section includes a skew driving section 171 provided to the longitudinal one side of the orthogonal mode transducer 140, a skew driven pulley 174 corresponding to the skew driven section, formed in the outer surface of the third adaptor 176 fixed to the orthogonal mode transducer 140 or one end of the orthogonal mode transducer 140, for receiving the driving force of the skew driving section 171 and simultaneously rotating the whole feeder including the polarizer 130, the low noise block down converter 150, the block up converter 184 and the orthogonal mode transducer 140, and skew bearing sections 179*a* and 179*b* for supporting one ends of the adapter of the polarizer or the second adapter 167 and the orthogonal mode transducer 140. At this time, the skew bearing sections 179*a* and 179*b* may support the first to third adapters 166, 167 and 176 except the polarizer 130, and both ends of the predetermined spot of the orthogonal mode transducer 140.

Further, the skew compensation section senses the rotation angle of the orthogonal mode transducer 140 or the skew driving section 171, and may include a skew angle sensing section 182 for controlling the actuation of the skew driving section 171. The skew angle sensing section 182 has the same actuating principal as the rotation angle sensing section 181, and therefore, the detailed description about it is omitted. With the skew angle sensing section 182, the skew driving section 171 senses the rotation amount of the orthogonal mode transducer 140, etc. and may control the rotation angles to compensate the skew generating on receiving the linearly polarized wave.

On the other hand, referring to FIG. 2, the circumference of the polarizer 130 may be disposed with a plurality of fixing bar 185 of the polarizer to be spaced with the outer surface thereof, and both sides of the orthogonal mode transducer 140 may be disposed with a supporting bracket 186. The skew driving section 171, the skew angle sensing section 182 and the skew driven pulley 174 may be fixed to the skew plate 180, and the skew plate 180 may be disposed with a tension pulley 173 for maintaining the tension of the belt (not shown) connecting the skew driving pulley 172 and the skew driven pulley 174.

Referring to FIG. 6, the orthogonal mode transducer 140 is shown. The orthogonal mode transducer 140 may include a first orthogonal mode transducer and a second orthogonal mode transducer connected thereto. Wherein, the second orthogonal mode transducer 146 may become a kind of an extender connected to the first orthogonal mode transducer 141. Further, the first orthogonal mode transducer 141 is integrally formed with the second orthogonal mode transducer 146.

As shown in FIG. 6, the first orthogonal mode transducer 141 may be furnished with a sharing port 145*a* communicated with one end of the polarizer 130 toward the feedhorn 120, a first flange 142 formed in the circumference of the sharing port 145*a* and fastened to the polarizer 130, and a second flange 143, formed in one end facing with the first flange 142, for fastening to the second orthogonal mode transducer 146. A bottom of the first orthogonal mode transducer 141 may be formed with a receiving port 144 connected with the low noise block down converter 150. At this time, it is desirable that the sharing port 145*a* and the receiving port 144 are orthogonal to each other.

On the other hand, the second orthogonal mode transducer 146 may include a third flange 147 for fastening to the second flange 143 of the first orthogonal mode transducer 141, a transmitting port 149 communicated with the sharing port 145*a* and the receiving port 144, and a fourth flange 148 formed in the perimeter of the transmitting port 149 and fastened with the third adaptor 176. The transmitting port 149 may be connected with the block up converter 184. That is, the sharing port 145*a*, the receiving port 144 and the transmitting port 149 formed in the orthogonal mode transducer 141 and 146 are communicated to each other, the sharing port 145*a* and the transmitting port 149 are formed on the same straight line, and the receiving port 144 is orthogonal to the sharing port 145*a* and the transmitting port 149.

Wherein, the receiving port 144 connected with the low noise block down converter 150 and the transmitting port 149 connected with the block up converter 184 have an approximately rectangular type. That is, a longitudinal direction L1 and transverse length L2 of the receiving port 144 are orthogonal to each other, and a longitudinal direction B1 and transverse direction B2 of the transmitting port 149 are orthogonal to each other. Further, the longitudinal direction L1 of the receiving port 144 and the transverse direction B2 of the transmitting port 149 are coincident with the direction of vertically or horizontally linearly polarized waves wherein, as shown in FIG. 6, the longitudinal direction L1 of the receiving port 144 and the transverse direction B2 of the transmitting port 149 are orthogonal to each other. Therefore, when the signals, received in the low noise block down converter 150, passing through the receiving port 144 are the vertically linearly polarized waves, the signals, transmitted from the block up converter 184, passing through the transmitting port 149 become the horizontally linearly polarized wave. When the signals, received in the low noise block down converter 150, passing through the receiving port 144 are the horizontally linearly polarized waves, the signals, transmitted from the block up converter 184, passing through the transmitting port 149 become the vertically linearly polarized wave.

Referring to FIG. 7, the low noise block down converter 150 connected to the receiving port 144 of the orthogonal mode transducers 141 and 146 is formed with the port 152 communicated with the receiving port 144, and the circumference of the port 152 may be formed with a flange 151 for fastening to the orthogonal mode transducers 141 and 146. The port 152 of the low noise block down converter 150 also has a rectangular type in which the longitudinal direction L1 thereof is orthogonal to the transverse direction L2 thereof, like the receiving port 144.

On the other hand, the low noise block down converter 150 is connected to the receiving port 144 of the orthogonal mode transducers 141 and 146, and as shown in FIG. 8, the waveguide 156 may be connected between the receiving port 144 of the orthogonal mode transducers 141 and 146 and the port 152 of the low noise block down converter 150. In this case, in case of connecting the waveguide 156, the waveguide 156 may be bent in a U type in consideration of the disposition of parts. One end of the waveguide 156 is formed with the port 158 communicated with the port 152 of the low noise block down converter 150, and the circumference of the port 158 may be formed with a connecting section 157 for fastening to the low noise block down converter 150.

The port of the orthogonal mode transducer 140 includes the sharing port 145*a* connected to the polarizer 130, the transmitting port 149 formed on the same line to face with the sharing port 145*a*, and the receiving port 144 formed to be crossed with the transmitting port 149, and the receiving port 144 and the transmitting port 149 may be formed in the rectangular type, respectively.

Wherein, the transmitting port 149 is connected with the block up converter 184 transmitting the satellite signals, the receiving port 144 is connected with the port 152 of the low noise block down converter 150, and the transverse direction of the transmitting port 149 may be crossed with the longitudinal direction of the receiving port 144.

The transverse direction of the transmitting port 149 and the longitudinal direction of the receiving port 144 are coincident with a vertically polarized wave direction and horizontally polarized wave direction, respectively or are coincident with the horizontally polarized wave direction and the vertically polarized wave direction, respectively.

On the other hand, reference numeral 145*b* in FIGS. 8A and 8B is a connecting port, formed on the same line, to be communicated with the sharing port 145*a* in a first orthogonal mode transducer 141.

Hereinafter, multi polarization transmission/receipt performed by the polarization conversion apparatus and the skew compensation performed by the skew compensation apparatus are described in the satellite VAST antenna 100 for transmitting/receiving the multiple polarized waves according to one embodiment of the present invention with reference to the drawings.

First, FIGS. 9A to 9H show the inside of the polarizer 130 when the satellite VAST antenna 100 according to one embodiment of the present invention transmits/receives the linearly polarized wave. On describing FIGS. 9A to 9H in more detail, when the satellite VAST antenna 100 transmits/receives the linearly polarized wave, the position or direction of the phase conversion section 132 in the polarizer 130, and the longitudinal direction of the receiving port 144 and the transverse direction of the transmitting port 149 are shown.

Referring to FIGS. 9A to 9D, it may recognize that the longitudinal direction of the receiving port 144 is a horizontal direction and the transverse direction of the transmitting port 144 is a vertical direction. Therefore, the signals received in the low noise block down converter 150 connected to the receiving port 144 are the horizontally linearly polarized waves, and the signals transmitted from the block up converter 184 connected to the transmitting port 149 are the vertically linearly polarized wave. Further, the phase conversion section 132 formed in the polarizer 130 is in parallel with or orthogonal to the horizontally or vertically linearly polarized wave direction of the low noise block down converter 150 and the block up converter 184. On describing in more detail, the position of the phase conversion section 132 formed in the polarizer 130 is in parallel with the horizontally linearly polarized wave direction (the transverse direction of the transmitting port) and is orthogonal to the vertically polarized wave direction (the longitudinal direction of the receiving port) in FIG. 9E and FIG. 9F, and the position of the phase conversion section 132 formed in the polarizer 130 is orthogonal to the horizontally linearly polarized wave direction (the transverse direction of the transmitting port) and is in parallel with the vertically polarized wave direction (the longitudinal direction of the receiving port) in FIG. 9G and FIG. 9H.

Referring to FIGS. 9E to 9H, it may recognize that the longitudinal direction of the receiving port 144 is a vertical direction and the transverse direction of the transmitting port 149 is a horizontal direction. Therefore, the signals received in the low noise block down converter 150 connected to the receiving port 144 are the vertically linearly polarized waves, and the signals transmitted from the block up converter 184 connected to the transmitting port 149 are the horizontally linearly polarized waves. Further, the phase conversion section 132 formed in the polarizer 130 is in parallel with or orthogonal to the vertically or horizontally linearly polarized wave direction of the low noise block down converter 150 and the block up converter 184. On describing in more detail, the position of the phase conversion section 132 formed in the polarizer 130 is in parallel with the horizontally linearly polarized wave direction (the transverse direction of the transmitting port) and is orthogonal to the vertically polarized wave direction (the longitudinal direction of the receiving port) in FIG. 9E and FIG. 9F, and the position of the phase conversion section 132 formed in the polarizer 130 is orthogonal to the horizontally linearly polarized wave direction (the transverse direction of the transmitting port) and is in parallel with the vertically polarized wave direction (the longitudinal direction of the receiving port) in FIG. 9G and FIG. 9H.

In this case, when the direction of the phase conversion section 132 formed in the polarizer 130 is orthogonal to or in parallel with the pin direction of the low noise block down converter 150 and the block up converter 184 or the longitudinal direction of the receiving port 144 connected with the low noise block down converter 150 and the transverse direction of the transmitting port of the orthogonal mode transducer 140 connected with the block up converter 184, because the phase conversion section 132 has no electricity, the polarization is entirely determined by the pin direction of the low noise block down converter 150 and the block up converter 184 or the longitudinal direction of the receiving port 144 connected with the low noise block down converter 150 and the transverse direction of the transmitting port 149 of the orthogonal mode transducer 140 connected with the block up converter 184.

That is, when the phase conversion section 132 of the polarizer 130 is orthogonal to or in parallel with the longitudinal direction of the receiving port 144 and the transverse direction of the transmitting port 149 of the orthogonal mode transducer 140, the polarizer 130 receives or transmits the vertically or horizontally linearly polarized wave. The phase conversion section 132 at this time has no electricity and therefore the linearly polarized wave is preceded as the linearly polarized wave without the polarization conversion as it is.

As shown in FIGS. 9A to 9H, when the phase conversion section 132 of the polarizer 130 is present, the circularly polarized wave is absent and the vertically or horizontally linearly polarized wave only is present and therefore the actuation of the polarization conversion apparatus is unnecessary. In this case, the actuation only of the skew compensation apparatus is necessary to compensate the skew caused due to the linearly polarized wave. But, the polarization conversion apparatus may be actuated to rotate the polarizer 130 so that the phase conversion section 132 is orthogonal to or in parallel with the vertically or horizontally linearly polarized wave. Even in this case, the polarization conversion apparatus does not rotate the polarizer 130 to convert the circularly polarized wave into the linearly polarized wave.

Likewise, the polarization conversion apparatus is formed to be communicated with the polarizer 130 and may change the angles of the phase conversion section 132 for the port 152 of the low noise block down converter 150 receiving the satellite signals passing through the polarizer 130 or the receiving port 144 or the transmitting port 149 of the orthogonal mode transducer 140. That is, when the satellite signals passing through the polarizer 130 are the vertically or horizontally linearly polarized waves, the polarization conversion apparatus may rotate the polarizer 130 and the phase conversion section 132 so that the phase conversion section 132 is in parallel with or orthogonal to the longitudinal direction of the port 152 of the low noise block down converter 150 or the receiving port 144 and the transmitting port 149. That is to say, the part of the feeder such as the polarizer 130 or the phase conversion section 132 may be rotated for the linearly polarized wave so that when the phase conversion section 132 of the polarizer 130 is orthogonal to the receiving port 144 of the orthogonal mode transducer 140, it is in parallel with the transmitting port 149 and, on the contrary, when it is in parallel with the receiving port 144, it is orthogonal to the transmitting port 149.

When the satellite signals passing through the polarizer 130 are the vertically or horizontally linearly polarized waves, the polarization conversion apparatus rotates the polarizer 130 so that the phase conversion section 132 is orthogonal to or in parallel with the longitudinal direction of the port 152 of the low noise block down converter 150 or the receiving port 144 and the transverse direction of the transmitting port 149 of the orthogonal mode transducer 140, and the skew compensation apparatus at once rotates the whole feeder including the polarizer 130, the low noise block down converter 150, the block up converter 184 and the orthogonal mode transducer 140 by the polarization conversion apparatus in the state rotating the polarizer 130 or the phase conversion section 132 to compensate the skew.

The skew compensation apparatus rotates the whole feeder, that is, all of the low noise block down converter 150, the orthogonal mode transducer 140 and the block up converter 184 based on other one rotation axis to compensate the skew in fixed state so that the phase conversion section 132 of the polarizer 130 is orthogonal to or in parallel with the receiving port 144 or the transmitting port 149 of the orthogonal mode transducer 140 based on one rotation axis rotating the polarizer 130 for the linearly polarized wave. At this time, two rotation axes have the same rotation center.

Next, FIGS. 10A to 10H show the inside of the polarizer 130 when the satellite VAST antenna 100 according to one embodiment of the present invention transmits/receives the circularly polarized wave. On describing FIGS. 10A to 10H in more detail, when the satellite VAST antenna 100 transmits/receives the circularly polarized wave, the position or direction of the phase conversion section 132 in the polarizer 130, and the longitudinal direction of the receiving port 144 and the transverse direction of the transmitting port 149 are shown.

Referring to FIGS. 10A to 10D, it may recognize that the longitudinal direction of the receiving port 144 of the orthogonal mode transducer 140 is a vertical direction and the transverse direction of the transmitting port 144 is a horizontal direction. At this time, the phase conversion section 132 in the polarizer 130 is at 45 degrees to the longitudinal direction of the receiving port 144 connected with the low noise block down converter 150 and the transverse direction of the transmitting port 149 connected with the block up converter 184, respectively.

Figures 10A, 10B, 10C, 10D, 10E, 10F, 10G, 10H:
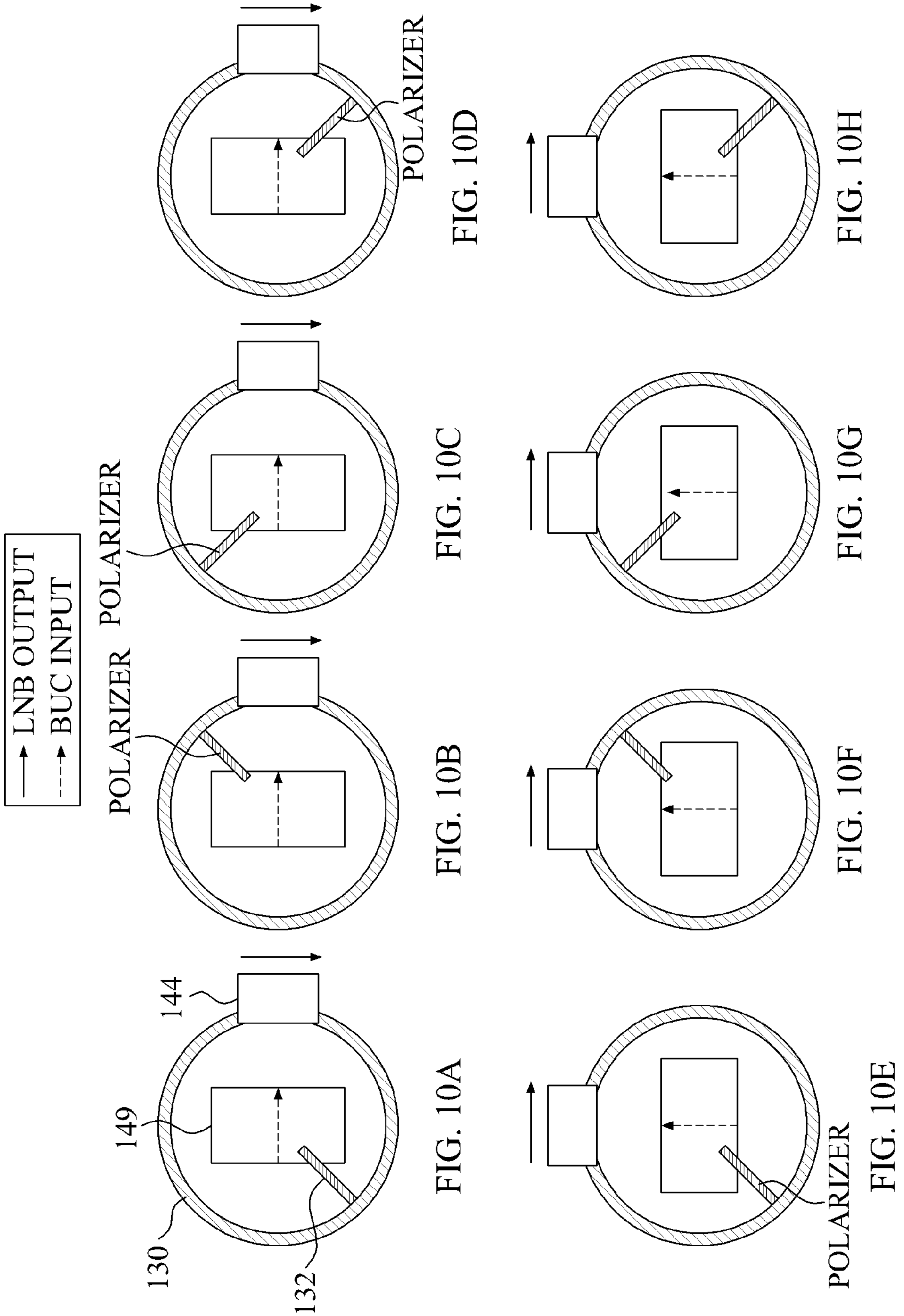
FIGS. 10A to 10H are views showing the inside of the polarizer when the satellite VSAT antenna shown in FIG. 1 transmits/receives circularly polarized wave.

On describing FIGS. 10A and 10B in more detail, the phase conversion section 132 in the polarizer 130 is at 45 degrees to the transverse direction of the transmitting port 149 and the longitudinal direction of the receiving port 144. Wherein, the positions of the phase conversion section 132 shown in FIGS. 10A and 10B are the state rotated at 180 degrees to each other, and the two cases become the same state. In the state positioned with the phase conversion section 132 as shown in FIGS. 10A and 10B, if the signals transmitted from the block up converter 184 connected to the transmitting port 149 is left hand circularly polarized wave (LHCP), the signals received in the low noise block down converter 150 connected to the receiving port 144 becomes right hand circularly polarized wave (RHCP).

On the other hand, the phase conversion section 132 in the polarizer 130 is at 45 degrees to the transverse direction of the transmitting port 149 and the longitudinal direction of the receiving port 144 in FIGS. 10C and 10D. Wherein, the positions of the phase conversion section 132 shown in FIGS. 10C and 10D are the state rotated at 180 degrees to each other, and the two cases become the same state. In the state positioned with the phase conversion section 132 as shown in FIGS. 10C and 10D, if the signals transmitted from the block up converter 184 connected to the transmitting port 149 is right left hand circularly polarized wave (LHCP), the signals received in the low noise block down converter 150 connected to the receiving port 144 becomes left hand circularly polarized wave (RHCP).

In FIGS. 10A to 10D, when the LHCP and RHCP are not absolutely determined by the position of the phase conversion section 132 and the polarization conversion apparatus rotates the position of the phase conversion section 132 in the polarizer 130 at 90 degrees, the block up converter 184 and the low noise block down converter 150 may always change to different circularly polarized wave.

Referring to FIGS. 10E to 10H, it may recognize that the longitudinal direction of the receiving port 144 is a horizontal direction and the transverse direction of the transmitting port 149 is a vertical direction. At this time, the phase conversion section 132 in the polarizer 130 is at 45 degrees to the longitudinal direction of the receiving port 144 connected with the low noise block down converter 150 and the transverse direction of the transmitting port 149 connected with the block up converter 184, respectively.

On describing FIGS. 10E and 10H in more detail, the phase conversion section 132 in the polarizer 130 is at 45 degrees to the transverse direction of the transmitting port 149 and the longitudinal direction of the receiving port 144. Wherein, the positions of the phase conversion section 132 shown in FIGS. 10E and 10F becomes the state rotated at 180 degrees to each other, and the two cases become the same state. In the state positioned with the phase conversion section 132 as shown in FIG. 10E or 10F, if the signals transmitted from the block up converter 184 connected to the transmitting port 149 is the LHCP, the signals received in the low noise block down converter 150 connected to the receiving port 144 becomes the RHCP.

On the other hand, the phase conversion section 132 in the polarizer 130 is at 45 degrees to the transverse direction of the transmitting port 149 and the longitudinal direction of the receiving port 144 in FIGS. 10G and 10H. Wherein, the positions of the phase conversion section 132 shown in FIGS. 10G and 10H become the state rotated at 180 degrees to each other, and the two cases become the same state. In the state positioned with the phase conversion section 132 as shown in FIGS. 10G and 10H, if the signals transmitted from the block up converter 184 connected to the transmitting port 149 is the RHCP, the signals received in the low noise block down converter 150 connected to the receiving port 144 becomes the LHCP.

FIGS. 10A to 10D and FIGS. 10E to 10H are the same about whether the transmitted or received signals become the RHCP or the LHCP.

Further, the actuation of the skew compensation apparatus does not need because the circular polarization signals are received or transmitted in FIGS. 10A to 10H, and the polarization conversion apparatus needs the actuation only for rotating the polarizer 130 so that the phase conversion section 132 rotates at 45 degrees to the longitudinal direction of the receiving port 144 or the transverse direction of the transmitting port 149.

The polarization conversion apparatus should rotate the polarizer 130 or the part of the feeder for the circular polarization so that the phase conversion section 132 of the polarizer 130 is simultaneously at 45 degrees to the receiving port 144 and the transmitting port 149 of the orthogonal mode transducer 140.

Likewise, both of the polarization conversion apparatus and skew compensation apparatus are independently actuated on transmitting/receiving the linearly polarized wave, and the skew compensation apparatus is not actuated and the polarization conversion apparatus only is actuated on transmitting/receiving the circularly polarized wave.

That is, the polarization conversion apparatus may rotate the polarizer 130 or the part of the feeder so that the phase conversion section 132 is at 45 degrees to the longitudinal direction of the port 152 of the low noise block down converter 150 or the receiving port 144 in the case that the satellite signals passing through the polarizer 130 are the circularly polarized waves.

As above, the polarization conversion apparatus receives and transmits the linearly polarized wave and the circularly polarized wave using one satellite VSAT antenna 100, the low noise block down converter 150 and the block up converter 184, and the skew compensation apparatus rotates at the skew angles to the whole feeder including the low noise block down converter 150, the block up converter 184 and the orthogonal mode transducer 140 to compensate the skew when the skew generates, thereby to prevent the loss of the satellite signals received according to the skew angles. At this time, the skew compensation apparatus rotates the whole feeder including the low noise block down converter 150, the orthogonal mode transducer 140 and the block up converter 184 on a different rotation axis having the concentric axis in the state rotated with the polarizer 130 or the part of the feeder, thereby to compensate the skew angles.

Both of the polarization conversion apparatus and skew compensation apparatus of the satellite VSAT antenna 100 in the present invention may rotate the polarizer 130 and therefore the polarization conversion apparatus and skew compensation apparatus rotates on functioning the center axis of the polarizer 130 as the concentric axis.

As described above, although the present invention is described by specific matters such as concrete components and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description. Therefore, the spirit of the present invention should not be limited to the above-described exemplary embodiments and the following claims as well as all modified equally or equivalently to the claims are intended to fall within the scopes and spirit of the invention.

The present invention may be used for maritime or air satellite antennas.

According to an embodiment of the present invention, the satellite VSAT antenna for transmitting/receiving multiple polarized waves may automatically receive and transmit multiple-polarized signals easily having the linearly polarized wave and circularly polarized wave characteristics by one feeder.

According to another embodiment of the present invention, the satellite VSAT antenna for transmitting/receiving multiple polarized waves may rotate the polarizer, the low noise block down converter, the block up converter, and the orthogonal mode transducer in a compact structure, thereby to conveniently manufacture it and to easily secure disposing spaces.

According to further another embodiment of the present invention, the satellite VSAT antenna for transmitting/receiving multiple polarized waves may transmit/receive multiple-polarized signals having linearly polarized wave and circularly polarized wave characteristics through one feedhorn and polarizer, and therefore the number of the parts used in the feedhorn and waveguide is decreased to save the cost of the parts.

According to still further, another embodiment of the present invention, the satellite VSAT antenna for transmitting/receiving multiple polarized waves automatically compensates the skew generated on performing the linearly polarized wave to prevent signal loss, and rotates the polarizer, and the low noise block down converter and the orthogonal mode transducer using a skew compensation apparatus being rotated to reduce power required for compensating the skew.

According to still further, another embodiment of the present invention, the satellite VSAT antenna for transmitting/receiving multiple polarized waves may implement the transmission and receipt of multiple-polarized signals and skew compensation by one feeder, thereby to enhance the convenience of maintenance.

What is claimed is:

1. A satellite VSAT antenna for transmitting/receiving multiple polarized waves, comprising:

a feedhorn for receiving signals from a satellite or transmitting the signals to the satellite;

a polarizer, connected to the feedhorn, for transmitting/receiving linearly polarized wave and circularly polarized wave of the satellite signals;

an orthogonal mode transducer, connected to the polarizer, for feeding multi band of the satellite signals;

a block up converter, connected to one end of the orthogonal mode transducer to face with the polarizer, for transmitting the satellite signals through the polarizer;

a low noise block down converter, connected to the orthogonal mode transducer to cross with the polarizer, for receiving the satellite signals passing through the polarizer;

a skew compensation apparatus, included in the orthogonal mode transducer, for simultaneously rotating the polarizer and the orthogonal mode transducer to compensate skew angles in the case that the satellite signals passing through the polarizer are the linearly polarized waves; and a polarization conversion apparatus, included in the polarizer, for rotating the polarizer in the case that the satellite signals passing through the polarizer are the circularly polarized waves.

2. The satellite VSAT antenna for transmitting/receiving the multiple polarized waves according to claim 1, wherein the polarization conversion apparatus includes a phase conversion section, in the polarizer having a hollow shape so that the satellite signals are passed, for converting the circularly polarized wave of the satellite signals into the linearly polarized wave; and a rotation section of the polarizer, at both ends of the polarizer, for rotating the polarizer.

3. The satellite VSAT antenna for transmitting/receiving the multiple polarized waves according to claim 2, wherein the rotation section of the polarizer includes a driving section provided to a longitudinal one side of the polarizer;

a driven section, in an outer surface of the polarizer, for receiving driving force of the driving section and rotating the polarizer; and a bearing section for supporting both ends of the polarizer.

4. The satellite VSAT antenna for transmitting/receiving the multiple polarized waves according to claim 3, wherein the rotation section of the polarizer includes a rotation angle sensing section for sensing rotation angles of the polarizer and for controlling the actuation of the driving section.

5. The satellite VSAT antenna for transmitting/receiving the multiple polarized waves according to claim 2, wherein a port of the orthogonal mode transducer includes a sharing port connected to the polarizer;

a transmitting port facing with the sharing port; and a receiving port crossing with the transmitting port, and the transmitting port and receiving port are formed in a rectangular type, respectively.

6. The satellite VSAT antenna for transmitting/receiving the multiple polarized waves according to claim 5, wherein the polarization conversion apparatus changes the angles of the phase conversion section for the receiving port or transmitting port of the orthogonal mode transducer.

7. The satellite VSAT antenna for transmitting/receiving the multiple polarized waves according to claim 6, wherein the polarization conversion apparatus rotates the polarizer so that the phase conversion section is at 45 degrees to the receiving port or transmitting port of the orthogonal mode transducer in the case that the satellite signals passing through the polarizer are the circularly polarized waves.

8. The satellite VSAT antenna for transmitting/receiving the multiple polarized waves according to claim 7, wherein the polarization conversion apparatus rotates the polarizer so that the phase conversion section is in parallel with or orthogonal to the receiving port or transmitting port of the orthogonal mode transducer in the case that the satellite signals passing through the polarizer are the linearly polarized waves.

9. The satellite VSAT antenna for transmitting/receiving the multiple polarized waves according to claim 6, wherein the skew compensation apparatus simultaneously rotates the polarizer, the low noise block down converter and the orthogonal mode transducer at a predetermined angle to compensate skew in the case that the satellite signals passing through the polarizer are the linearly polarized waves.

10. The satellite VSAT antenna for transmitting/receiving the multiple polarized waves according to claim 9, wherein the skew compensation apparatus includes a skew compensation section, at one end of the polarizer and orthogonal mode transducer, for rotating the polarizer and orthogonal mode transducer at once.

11. The satellite VSAT antenna for transmitting/receiving the multiple polarized waves according to claim 10, wherein the skew compensation section includes a skew driving section provided to the longitudinal one side of the orthogonal mode transducer;

a skew driven section, in the outer surface of the orthogonal mode transducer, for receiving the driving force of the skew driving section and for simultaneously rotating the polarizer and orthogonal mode transducer; and a skew bearing section for supporting one end of the polarizer and one end of the orthogonal mode transducer.

12. The satellite VSAT antenna for transmitting/receiving the multiple polarized waves according to claim 11, wherein the skew compensation section includes a skew angle sensing section for sensing rotation angles of the orthogonal mode transducer and for controlling the actuation of the skew driving section.

13. The satellite VSAT antenna for transmitting/receiving the multiple polarized waves according to claim 11, wherein, in the case that the satellite signals passing through the polarizer are the linearly polarized waves, the polarization conversion apparatus rotates the polarizer so that the phase conversion section is orthogonal to or in parallel with the receiving port or transmitting port of the orthogonal mode transducer, and the skew compensation apparatus rotates the polarizer and orthogonal mode transducer at once to compensate the skew in the state being rotated with the phase conversion section by the polarization conversion apparatus.

14. The satellite VSAT antenna for transmitting/receiving the multiple polarized waves according to claim 13, wherein the transmitting port is coupled with the block up converter and the receiving port is coupled with the low noise block down converter, and the transverse direction of the transmitting port is crossed with the longitudinal direction of the receiving port.

15. The satellite VSAT antenna for transmitting/receiving the multiple polarized waves according to claim 14, wherein the transverse direction of the transmitting port and the longitudinal direction of the receiving port are coincident with vertically and horizontally polarized wave direction, respectively, or with horizontally and vertically polarized wave direction.

* * * * *